(12) United States Patent
Yin et al.

(10) Patent No.: US 8,319,651 B2
(45) Date of Patent: Nov. 27, 2012

(54) ELECTRONIC DEVICE PROVIDING CHARGE STATUS

(75) Inventors: Hui Yin, Shenzhen (CN); Yan-Ling Geng, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 732 days.

(21) Appl. No.: 12/547,492

(22) Filed: Aug. 26, 2009

(65) Prior Publication Data

US 2010/0328086 A1 Dec. 30, 2010

(30) Foreign Application Priority Data

Jun. 25, 2009 (CN) .......................... 2009 1 0303671

(51) Int. Cl.
*G08B 21/18* (2006.01)
*H02J 7/00* (2006.01)

(52) U.S. Cl. ......... 340/636.2; 320/162; 307/22; 307/26; 455/573; 713/340

(58) Field of Classification Search .......... 320/103–115, 320/162–164, 149; 340/636.1–636.2; 307/22, 307/26, 66; 455/343.1, 343.6, 572, 573; 713/300, 340

See application file for complete search history.

(56) References Cited

U.S. PATENT DOCUMENTS

| 5,218,607 | A | * | 6/1993 | Saito et al. | 714/22 |
| 5,754,868 | A | * | 5/1998 | Yamamoto et al. | 713/300 |
| 7,250,694 | B2 | * | 7/2007 | Lin | 307/22 |
| 7,821,228 | B2 | * | 10/2010 | Zhu et al. | 320/114 |
| 7,839,119 | B2 | * | 11/2010 | Onose | 320/113 |
| 2009/0179614 | A1 | * | 7/2009 | Klemm et al. | 320/108 |

* cited by examiner

*Primary Examiner* — George Bugg
*Assistant Examiner* — Anne Lai
(74) *Attorney, Agent, or Firm* — Altis Law Group, Inc.

(57) ABSTRACT

An electronic device includes a switching circuit, a hardware (HD) indication unit, a LED module, a software (SF) indication unit, a first control switch electrically connected between a power port, an anode of the LED module, and the HD indication unit, and a second control switch connected between a cathode of the LED module, the SF indication unit and ground. When the electronic device is charged in a powered off state, the cathode of the LED module is grounded, the HD indication unit directs the first control switch to turn on and off alternatingly, and the LED module flashes accordingly. When the electronic device is charged in a powered state, the anode of the LED module is at a high voltage level, and the SF indication unit directs the second control switch to turn on and off alternatingly, and the LED module flashes accordingly.

12 Claims, 2 Drawing Sheets

ELECTRONIC DEVICE PROVIDING CHARGE STATUS

BACKGROUND

1. Technical Field

The disclosure relates to electronic devices and, particularly, to an electronic device providing charge status.

2. Description of Related Art

As electronic devices such as mobile phones and media players become more popular, some electronic devices use built-in rechargeable batteries as power source, with an attendant requirement for frequent recharging thereof.

Very often, during recharging, there is a need to indicate the charge status to prompt user action. However, most circuits indicating charge status employ special integrated circuits, which are costly.

Therefore, it is beneficial to provide an electronic device with a simple indication circuit overcoming the limitations described.

BRIEF DESCRIPTION OF THE DRAWINGS

The components in the drawings are not necessarily drawn to scale, the emphasis instead being placed upon clearly illustrating the principles of the electronic device. Moreover, in the drawings, like reference numerals designate corresponding parts throughout the several views.

DETAILED DESCRIPTION

Figure 1:
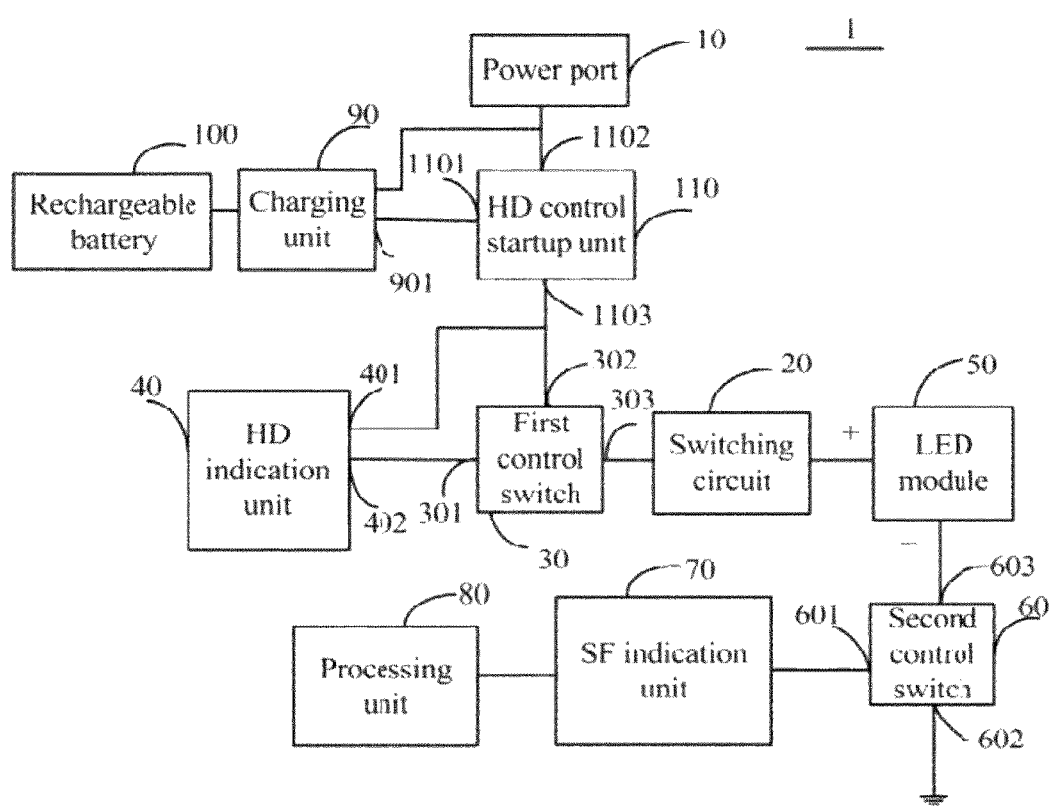
FIG. 1 is a block diagram of an electronic device providing charge status in accordance with an exemplary embodiment.

Referring to FIG. 1, an electronic device 1 providing charge status during recharge of a rechargeable battery 100 is disclosed. The electronic device 1 includes a power port 10, a switching circuit 20, a first control switch 30, a hardware (HD) indication unit 40, a light-emitting diode (LED) module 50, a second control switch 60, a software (SF) indication unit 70, a processing unit 80, and a charging unit 90.

The power port 10 is configured to connect an external power source (not shown), such as an alternating current power source. The charging unit 90 is configured to convert the alternating current into direct current and charge the rechargeable battery 100.

The first control switch 30 includes a control terminal (301), a first path terminal (302), and a second path terminal (303). The first path terminal 302 of the first control switch 30 is electrically connected to the power port 10, and the second path terminal 303 of the first control switch 30 is connected to an anode of the LED module 50 via the switching circuit 20. In the exemplary embodiment, the LED module 50 includes a plurality of LEDs.

The HD indication unit 40 includes an input terminal 401 electrically connected to the power port 10, and an output terminal 402 connected to the control terminal 301 of the first control switch 30. When the power port 10 is connected to the external power source, the input terminal 401 of the HD indication unit 40 receives power from the external power source via the power port 10, and the output terminal 402 of the HD indication unit 40 outputs pulse signals.

The second control switch 60, connected between a cathode of the LED module 50 and ground, includes a control terminal 601, a first path terminal 602, and a second path terminal 603. The SF indication unit 70 includes an input terminal connected to the processing unit 80, and an output terminal connected to the control terminal 601 of the second control switch 60.

The switching circuit 20 is connected between the first control switch 30 and the anode of the LED module 50. When the electronic device 1 is recharged in a powered off state, the cathode of the LED module 50 is grounded, and the switching circuit 20 establishes the connection between the first control switch 30 and the anode of the LED module 50. During recharge, the input terminal of the HD indication unit 40 receives power from the external power source and the output terminal of the HD indication unit 40 outputs the pulse signals to the control terminal of the first control switch 30. The first control switch 30 is turned on and off alternatingly when the control terminal of the first control switch 30 receives the pulse signals. Therefore, the connection between the anode of the LED module 50 and the power port 10 is established or disconnected alternatingly, accordingly, the LED module 50 flashes.

When the electronic device 1 is charged in a powered state, the switching circuit 20 disconnects the anode of the LED module 50 and the first control switch 30, and provides a high voltage to the anode of the LED module 50. The SF indication unit 70 turns the second control switch 60 on and off alternatingly under control of the processing unit 80. Therefore, the connection between the cathode of the LED module 50 and the ground is established or disconnected alternatingly, accordingly, the LED module 50 flashes.

In the embodiment, the electronic device 1 further includes a hardware (HD) control startup unit 110. The HD control startup unit 110 is connected with the power port 10, the HD indication unit 40, and the first control switch 30. The hardware (HD) control startup unit 110 includes a control terminal 1101 connected to an indication terminal 901 of the charging unit 90. In the embodiment, when the rechargeable battery 100 is not fully charged, the indication terminal 901 of the charging unit 90 outputs a charging signal, the HD control startup unit 110 is turned on when it receives the charging signal, and the LED module 50 flashes due to connection of the anode of the LED module 50 to the power port 10 or disconnection therefrom. When the rechargeable battery 100 is fully recharged, the indication terminal 901 of the charging unit 90 outputs a stopping signal, which turns off the HD control startup unit 110 upon receipt thereof. The anode of the LED module 50 and the power port 10 are disconnected, and the LED module 50 stops flashing.

In the embodiment, when the electronic device 1 is charged in a powered state and the rechargeable battery 100 is fully charged, the SF indication unit 70 turns off the second control switch 60 under direction of the processing unit 80. Connection between the cathode of the LED module 50 and the ground is cut off, and the LED module 50 stops flashing.

Figure 2:
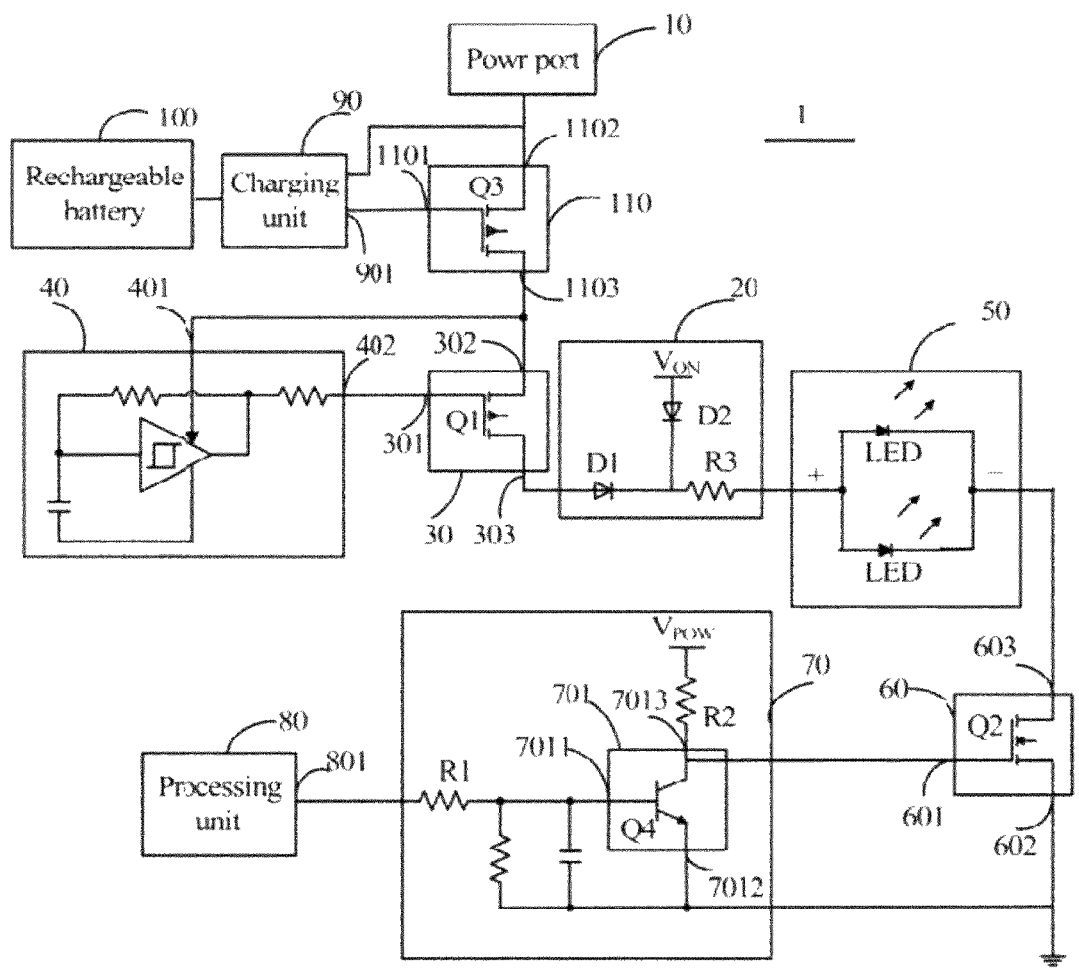
FIG. 2 is a circuit diagram of the electronic device of FIG. 1.

Referring to FIG. 2, in the exemplary embodiment, the HD control startup unit 110 is a low voltage activated switch. The HD control startup unit 110 includes the control terminal 1101, a first path terminal 1102, and a second path terminal 1103. The first control switch 30 is a low voltage activated switch and the second control switch 60 is a high voltage activated switch. In the exemplary embodiment, p-channel metal-oxide-semiconductor field-effect transistors (PMOSFET) Q1, Q3 are used as an example to illustrate the first control switch 30 and the HD control startup unit 110, and an n-channel metal-oxide-semiconductor field-effect transistor (NMOSFET) Q2 is used as an example to illustrate the second control switch 60. Gates, sources, drains of the MOSFETs Q1, Q2, and Q3 constitute the control terminals, the first path terminals, the second path terminals of the first control switch 30, the second control switch 60 and the HD control startup unit 110 respectively. In other embodiments, the first control switch 30, the second control switch 60 and the HD control startup unit 110 can be bipolar junction transistors (BJTs).

The switching circuit 20 includes a first unidirectional switch D1 and a second unidirectional switch D2. In the exemplary embodiment, the first and second unidirectional switches D1 and D2 are diodes. The first unidirectional switch D1 is connected between the drain of the NMOSFET Q1 and the anode of the LED module 50, and the second unidirectional switch D2 is connected between a first potential point $V_{ON}$ and the anode of the LED module 50. The first potential point $V_{ON}$ is connected to a working voltage terminal of the electronic device 1, and is at high voltage when the electronic device 1 is powered and low voltage when the electronic device 1 is powered off.

In the exemplary embodiment, the HD indication unit 40 is a pulse trigger 40. The pulse trigger 40 includes an input terminal connected to the drain of the PMOSFET Q3, and an output terminal connected to the gate of the PMOSFET Q1. The source of the PMOSFET Q3 is connected to the power port 10, the gate of the PMOSFET Q3 is connected to the indication terminal 901 of the charging unit 90, and the drain of the PMOSFET Q3 is further connected to the source of the PMOSFET Q1. In the exemplary embodiment, the indication terminal 901 of the charging unit 90 outputs a low voltage charging signal when the rechargeable battery 100 is not fully charged, and outputs a high voltage stopping signal when the rechargeable battery 100 is fully charged. Thus, the PMOSFET Q3 is turned on when the rechargeable battery 100 is not fully charged and off when the rechargeable battery 100 is fully charged.

The SF indication unit 70 includes a third control switch 701. The third control switch 701 includes a control terminal 7011, a first path terminal 7012, and a second path terminal 7013. In the exemplary embodiment, a negative-positive-negative (NPN) bipolar junction transistor (BJT) Q4 is used as an example to illustrate the third control switch 701. A base, an emitter, and a collector of the NPN BJT Q4 constitute the control terminal 7011, the first path terminal 7012, the second path terminal 7013 of the third control switch 701. In other embodiments, the third control switch 701 can be an NMOSFET.

A base of the NPN Q4 is connected to a pulse signal pin 801 of the processing unit 80 via a first resistor R1, and a collector of the NPN Q4 is connected to a second potential point $V_{pow}$ via a second resistor R2, and an emitter of the NPN Q4 is grounded. The collector of the NPN Q4 is further connected to the gate of the NMOSFET Q2. The second potential point $V_{pow}$ is connected to the power port 10. When the power port 10 connects with the external power source, the second potential point $V_{pow}$ is at high voltage, the source of the NMOSFET Q2 is grounded, and the drain of the NMOSFET Q2 is connected to the cathode of the LED module 50.

When the electronic device 1 is powered off and the power port 10 connects the external power source to recharge the rechargeable battery 100 of the electronic device 1, as described, the second potential point $V_{pow}$ is at high voltage, and the gate of the NMOSFET Q2, which is connected to the second potential point $V_{pow}$ via the second resistor R2, further receives a high voltage, and the NMOSFET Q2 is turned on. The cathode of the LED module 50 is grounded via the NMOSFET Q2 which is turned on. As described, when the rechargeable battery 100 is not fully charged, the PMOSFET Q3 is at on state, the input terminal 401 of the pulse trigger 40, which is connected to the power port, receives power from the external power source via the PMOSFET Q3, and the output terminal 402 of the pulse trigger 40 outputs pulse signals to control the PMOSFET Q1 to turn on and off alternatingly. Then the connection between the anode of the LED module 50 and the power port 10 is established and disconnected alternatingly, accordingly, the LED module 50 flashes.

When the rechargeable battery 100 is fully charged, as described, the PMOSFET Q3 is turned off, the anode of the LED module 50 and the power port 10 are disconnected, and the LED module 50 stops flashing.

When the electronic device 1 is powered and the power port 10 connects to the external power source to recharge the rechargeable battery 100, the first potential point $V_{ON}$ is at high voltage and the unidirectional switch D1 is turned off. The anode of the LED module 50 and the PMOSFET Q1 are disconnected. The anode of the LED module 50 is connected to the first potential point $V_{ON}$ at high voltage via the second unidirectional switch D2 when the electronic device 1 is powered.

The pulse signal pin 801 of the processing unit 80 outputs pulse signals when the electronic device 1 is charged in a powered state, and the NPN BJT Q4 is turned on and off alternatingly when the base of the NPN BJT Q4 receives the pulse signals via the first resistor R1.

When the NPN BJT Q4 is turned on, the gate of the NMOSFET Q2 is grounded via the NPN BJT Q4 and the NMOSFET Q2 is turned off accordingly, the cathode of the LED module 50 and the ground are disconnected, and the LED module 50 is lit. When the NPN BJT Q4 is turned off, the gate of the NMOSFET Q2 obtains a high voltage from the second potential point $V_{pow}$ via the second resistor R2, and the NMOSFET Q2 is turned on accordingly, whereby the cathode of the LED module 50 is grounded via the NMOSFET Q2, and the LED module 50 is no longer lit. Accordingly, the LED module 50 flashes when the pulse signal pin of the processing unit 80 outputs the pulse signals.

When the rechargeable battery 100 is fully charged, the pulse signal pin 801 of the processing unit 80 stops outputting the pulse signals and outputs a high voltage signal to turn on the NPN BJT Q4, and the gate of the NMOSFET Q2, grounded via the NPN BJT Q4 and the NMOSFET Q2, is turned off accordingly. The cathode of the LED module 50 and the ground are disconnected, and the LED module 50 stops flashing.

Thus, in the disclosure, the electronic device employs hardware to indicate a charge status during recharging in a powered off state, and employs software to indicate the charge status when the electronic device is charged in a powered state. As disclosed, the electronic device is also capable of providing different indications of whether the rechargeable battery is fully charged. In detail, the electronic device directs the LED module to flash when the rechargeable battery is not fully charged and stop flashing when the rechargeable battery 100 is fully charged.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the present disclosure.

What is claimed is:
1. An electronic device, comprising:
   a power port configured for connecting to an external power source;
   a processing unit;
   an LED module comprising an anode and a cathode;
   a hardware indication unit connected to the power port;

a first control switch electrically connected with the power port, the anode of the LED module, and the hardware indication unit;
a software indication unit connected to the processing unit;
a second control switch electrically connected with the cathode of the LED module, the software indication unit, and ground;
a switching circuit connected between the first control switch and the anode of the LED module;
wherein, when the electronic device is powered off and the power port connects the external power source to recharge a rechargeable battery of the electronic device, the cathode of the LED module is grounded, the hardware indication unit directs the first control switch to turn on and off alternatingly, the connection between the anode of the LED module and the power port is established and disconnected alternatingly, and the LED module flashes; when the electronic device is powered on and the power port connects the external power source to recharge the rechargeable battery, the switching circuit disconnects the connection between the first control switch and the anode of the LED module and connects the anode of the LED module to a high voltage point, the software indication unit directs the second control switch to turn on and off alternatingly, and the connection between the cathode of the LED module and the ground is established and disconnected alternatingly, thereby the LED module flashes.

2. The electronic device of claim 1, wherein the switching circuit comprises:
a first unidirectional switch connected between the first control switch and the anode of the LED module; and
a second unidirectional switch connected between a first potential point and the anode of the LED module.

3. The electronic device of claim 1, wherein the first potential point is connected to a working voltage terminal of the electronic device, and when the electronic device is powered off, the first potential point is at low voltage, and when the electronic device is powered, the first potential point is at high voltage and the first unidirectional switch is turned off.

4. The electronic device of claim 3, further comprising:
a charging unit configured for recharging the rechargeable battery;
a hardware control startup unit connected with the power port, the first control switch, the hardware indication unit, and the charging unit;
wherein, when the rechargeable battery is not fully charged, the charging unit outputs a charging signal to the hardware control startup unit and turns on the hardware control startup unit, and when the rechargeable battery is fully charged, the charging unit outputs a stopping signal to the hardware control startup unit and turns off the hardware control startup unit, and the power port and the first control switch are disconnected.

5. The electronic device of claim 4, wherein the hardware control startup unit is a low voltage activated switch including a control terminal, a first path terminal, and a second path terminal, the first path terminal is connected to the power port, the second path terminal is connected to the first control switch, and the hardware indication unit, the control terminal is connected to an indication terminal of the charging unit, the indication terminal of the charging unit outputs a low voltage charging signal when the rechargeable battery is not fully charged and turns on the hardware control startup unit, and the indication terminal of the charging unit outputs a high voltage stopping signal when the rechargeable battery is fully charged and turns off the hardware control startup unit.

6. The electronic device of claim 5, wherein the hardware indication unit comprises a pulse trigger, the pulse trigger comprises an input terminal connected to the second path terminal of the hardware control startup unit, and an output terminal connected to a control terminal of the first control switch; the first control switch further comprises a first path terminal connected to the second path terminal of the hardware control startup unit, and a second path terminal connected to the anode of the LED module, and when the rechargeable battery is not fully charged, the input terminal of the pulse trigger receives power from the external power source via the hardware control startup unit and the output terminal of the pulse trigger outputs pulse signals, the control terminal of the first control switch receives the pulse signals and turn on and off the first control switch alternatingly, and the connection between the power port and the anode of the LED module is established and disconnected alternatingly, thereby the LED module flashes.

7. The electronic device of claim 5, wherein the hardware control startup unit is a PMOSFET or a PNP BJT.

8. The electronic device of claim 3, wherein the second control switch comprises a control terminal, a first path terminal connected to the ground, and a second path terminal connected to the cathode of the LED module, the software indication unit comprises a third control switch which comprises a control terminal, a first path terminal, and a second path terminal, the control terminal of the third control switch is connected to a pulse signal pin of the processing unit, the first path terminal of the third control switch is connected to ground, the second path terminal of the third control switch is connected to a second potential point via a resistor, and the second path terminal of the third control switch is further connected to the control terminal of the second control switch.

9. The electronic device of claim 8, wherein the second potential point is connected to the power port, and when the electronic device is powered and the power port receives the external power source to recharge the rechargeable battery, the second potential point is at high voltage, the pulse signal pin of the processing unit outputs pulse signals and directs the third control switch to turn on and off alternatingly; when the third control switch is turned on, the control terminal of the second control switch is grounded via the third control switch, the second control switch is turned off and the cathode of the LED module and the ground are disconnected, and when the third control switch is turned off, the control terminal of the second control switch obtains a high voltage from the second potential point via the resistor, the second control switch is turned on and establishes the connection between the cathode of the LED module and the ground.

10. The electronic device of claim 9, wherein when the electronic device is powered and the rechargeable battery is fully charged, the pulse signal pin of the processing unit outputs a high voltage signal and turns on the third control switch, the control terminal of the second control switch is grounded via the third control switch, and the cathode of the LED module and the ground are disconnected.

11. The electronic device of claim 8, wherein the third control switch is an NMOSFET or an NPN BJT.

12. The electronic device of claim 1, wherein the first control switch is a p-channel metal-oxide-semiconductor field-effect transistor (PMOSFET) or a negative-positive-negative (NPN) bipolar junction transistor (BJT), and the second control switch is an n-channel metal-oxide-semiconductor field-effect transistor (NMOSFET) or a positive-negative-positive (PNP) bipolar junction transistor (BJT).

* * * * *